United States Patent
Wu et al.

(10) Patent No.: US 12,229,139 B2
(45) Date of Patent: Feb. 18, 2025

(54) RETRIEVING DATA FROM STREAMING STORAGE

(71) Applicant: Dell Products, L.P., Round Rock, TX (US)

(72) Inventors: Yurun Wu, Shanghai (CN); Jiang Cao, Shanghai (CN); Lu Lei, Shanghai (CN); Willa Lang Yuan, Shanghai (CN); Jian Gong, Shanghai (CN); Lemonie Mengchi Li, Shanghai (CN); Xiaoxiao Mao, Shanghai (CN); Shu Jiang, Shanghai (CN); Kalyan Gunda, Bangalore (IN); Ao Sun, Shanghai (CN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/345,052

(22) Filed: Jun. 30, 2023

(65) Prior Publication Data
US 2025/0005023 A1    Jan. 2, 2025

(51) Int. Cl.
*G06F 16/00* (2019.01)
*G06F 16/2453* (2019.01)
*G06F 16/2455* (2019.01)

(52) U.S. Cl.
CPC .... *G06F 16/2455* (2019.01); *G06F 16/24542* (2019.01)

(58) Field of Classification Search
CPC .............. G06F 16/2455; G06F 16/24542
USPC .................................. 707/600–899
See application file for complete search history.

(56) References Cited

U.S. PATENT DOCUMENTS

| | | | |
|---|---|---|---|
| 8,909,894 B1 * | 12/2014 | Singh | G06F 9/5077 711/170 |
| 9,563,385 B1 * | 2/2017 | Kowalski | G06F 3/0665 |
| 10,976,949 B1 * | 4/2021 | Calhoun, Jr. | G06F 3/0643 |
| 12,001,435 B2 * | 6/2024 | Yang | G06F 16/2477 |
| 2020/0310668 A1 * | 10/2020 | Li | G06F 3/0683 |

OTHER PUBLICATIONS

Wu, et al. "Using Chunks of Data to Store Streaming Data at a Cloud Service Provider" U.S. Appl. No. 18/345,045, filed Jun. 30, 2023, 50 pages.

* cited by examiner

*Primary Examiner* — Michelle N Owyang
(74) *Attorney, Agent, or Firm* — Amin, Turocy & Watson, LLP

(57) ABSTRACT

The technologies described herein are generally directed toward retrieving data from streaming storage. In an embodiment, a method can include receiving an application data request that identifies application data to be retrieved from a sequence of stored data chunks that correspond to a stored stream of data. The method can further include, based on the application data request, estimating a first estimated location of the application data, with the first estimated location including an identified chunk of a sequence of chunks. Further, the method can include, based on the application data request and a characteristic of the identified chunk, retrieving, by the system, a first data block that is estimated to comprise the application data, resulting in a first retrieved data block.

20 Claims, 10 Drawing Sheets

RETRIEVING DATA FROM STREAMING STORAGE

BACKGROUND

Modern data storage systems can facilitate the storage and manipulation of data streams. Different approaches can be used to improve the performance and scalability of the data storage, retrieval, and manipulation of data streams operations. In some circumstances, approaches to increase the performance of random-access retrieval of stored streaming data can lead to significant increases in overhead. This can be significant because, in many circumstances, the additional overhead can outweigh the benefits gained from the increased retrieval performance.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to receive an application data request that identifies application data to be retrieved from a sequence of stored data chunks that correspond to a stored stream of data. The instructions can further include an instruction to, based on the application data request, estimate a first estimated location of the application data, wherein the first estimated location comprises an identified chunk of a sequence of chunks. The instructions can further include an instruction, based on the application data request and a characteristic of the identified chunk, retrieve a first data block that is estimated to include the application data, resulting in a first retrieved data block.

In additional or alternative embodiments, the application data request can include a target logical stream offset of the application data, with the target logical stream offset identifying a position relative to a different position specified in the stored stream of data. In additional or alternative embodiments, the instructions can further include, based on the target logical stream offset, analyzing the first retrieved data block, resulting in an analyzed first retrieved data block. In additional or alternative embodiments, the instructions can further include, based on the analyzed first retrieved data block, retrieving, by the system, a second retrieved data block from a second estimated location.

In additional or alternative embodiments, the instructions can further include, based on the second retrieved data block, identifying, by the system, a physical address corresponding to a location of the application data. In additional or alternative embodiments, the instructions can further include, based on the physical address, facilitating, by the system, retrieving the application data. In additional or alternative embodiments, the identified chunk can be identified based on the target logical stream offset being determined to be within a starting logical stream offset for the identified chunk and an ending logical stream offset. In additional or alternative embodiments, the characteristic of the identified chunk can include a number of data frames within the identified chunk, and an average data frame size for the identified chunk. In additional or alternative embodiments, the average data frame size for the identified chunk can be determined based on the number of data frames within the identified chunk and a logical chunk size of the identified chunk.

In additional or alternative embodiments, the logical chunk size of the identified chunk can correspond to a difference between the starting logical stream offset and the ending logical stream offset. In additional or alternative embodiments, the instructions can further include, based on the application data request, analyzing, by the system, the first retrieved data block. In additional or alternative embodiments, the instructions can further include, based on the analyzing, identifying, by the system, a physical address corresponding to a location of the application data. In additional or alternative embodiments, the instructions can further include, based on the physical address, facilitating, by the system, retrieving the application data.

An example method can comprise receiving an application data request that identifies application data to be retrieved from a sequence of stored data chunks that correspond to a stored stream of data. Further, the method can include, based on the application data request, estimating a first estimated location of the application data, wherein the first estimated location comprises an identified chunk of a sequence of chunks. Further, the method can include, based on the application data request and a characteristic of the identified chunk, retrieving a first data block that is estimated to include the application data, resulting in a first retrieved data block.

An example non-transitory computer-readable medium can comprise instructions that, in response to execution, cause a system comprising a processor to perform operations. These operations can comprise, based on first application data, an operation to receive an application data request that identifies application data to be retrieved from a sequence of stored data chunks that correspond to a stored stream of data. Further, the operations can include an operation to, based on the application data request, estimate a first estimated location of the application data, wherein the first estimated location comprises an identified chunk of a sequence of chunks. Further, the operations can include an operation to, based on the application data request and a characteristic of the identified chunk, retrieve a first data block that is estimated to include the application data, resulting in a first retrieved data block.

In additional or alternative embodiments, the identified chunk can be identified based on the target logical stream offset being determined to be within a starting logical stream offset for the identified chunk and an ending logical stream offset. In additional or alternative embodiments, the characteristic of the identified chunk comprises a number of data frames within the identified chunk, and an average data frame size for the identified chunk. In additional or alternative embodiments, the average data frame size for the identified chunk was determined based on the number of data frames within the identified chunk and a logical chunk size of the identified chunk. In additional or alternative embodiments, the logical chunk size of the identified chunk corresponds to a difference between the starting logical stream offset and the ending logical stream offset.

In additional or alternative embodiments, the operations further comprise analyzing the first retrieved data block, and based on the analyzing, identifying a physical address corresponding to a location of the application data, and obtaining the application data based on the physical address. In additional or alternative embodiments, estimating the first estimated location includes, receiving, from a mapping database, a mapping of the application data to the identified chunk.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate retrieving data from streaming storage. One or more embodiments can use different approaches to retrieve data from streaming storage.

As is understood by one having skill in the relevant art(s), given the description herein, the implementation(s) described herein are non-limiting examples, and variations to the technology can be implemented. For instance, even though many examples described herein discuss cloud storage devices, the technologies described herein can be used in many applicable circumstances, e.g., storing streams data with other types of data storage. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Generally, one or more embodiments can facilitate the use of cloud storage systems for the storage and retrieval of streaming data, e.g., a continuous and unbounded data flow that can be generated by various data sources with high data volumes and velocity.

Figure 1:
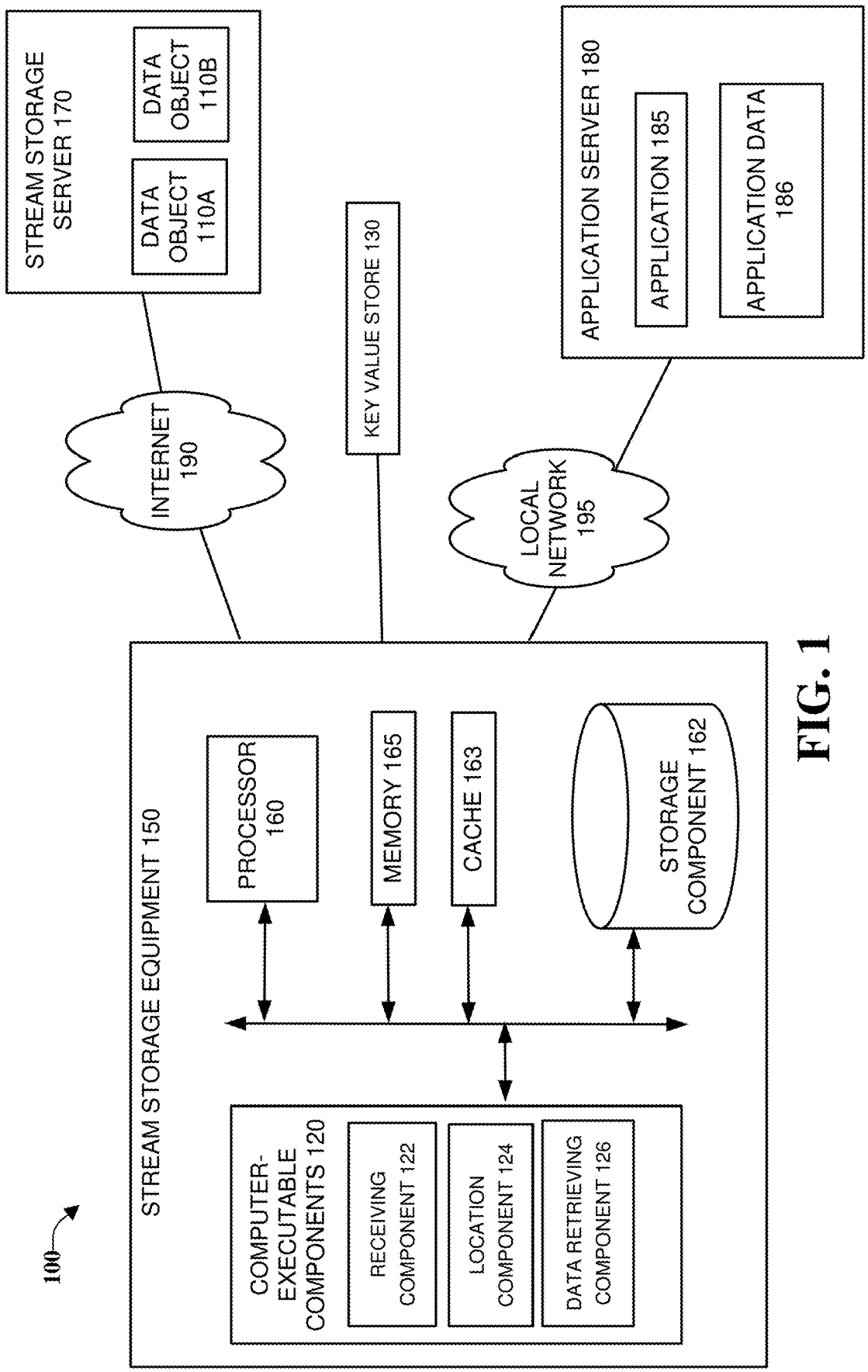
FIG. 1 is an architecture diagram of an example system that can facilitate retrieving data from streaming storage, in accordance with one or more embodiments.

FIG. 1 is an architecture diagram of an example system 100 that can facilitate retrieving data from streaming storage, in accordance with one or more embodiments. For purposes of brevity, description of like elements and/or processes employed in other embodiments is omitted. As depicted, system 100 includes stream storage equipment 150 connected to stream storage server 170 via internet 190, and application server 180 via local network 195. Application server 180 includes application 185 and application data 186. Application 185 is representative of an application with data storage and retrieval requirements, and application data 186 is representative of the data utilized by application 185.

In one or more embodiments, stream storage server 170 can include data objects 110A-B. In some implementations, stream storage server 170 can be operated based on de facto standards for many different third-party object storage systems, e.g., systems widely adopted as the storage layer for cloud computing and data lakes. Different approaches to utilizing cloud storage systems can utilize dedicated local file systems on each node for storage, with this approach potentially limiting the capacity to rapidly scale the systems. This locally dedicated storage approach can also limit the use of data storage structures other than file systems, which in turn can limit the usage scenarios of stream storage systems. As discussed further below, to facilitate access to information store by embodiment described herein, key value store 130 can be used to persist as metadata, different offset values that identify the location of stored data.

Stream storage equipment 150 includes memory 165, processor 160, storage component 162, and cache 163. According to multiple embodiments, memory 165 of stream storage equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include receiving component 122, location component 124, data retrieving component 126 and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, local network 195 and internet 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can comprise non-volatile random-access memory (NVRAM), with different uses including journaled manipulation of storage component 162 data and the enabling of concurrent updating of some types of stored data, in accordance with one or more embodiments. In some embodiments, cache 163 can comprise volatile memory used for caching chunk data to promote visibility of transaction data as the transaction is open.

It is understood that the computer processing systems, computer-implemented methods, apparatus, and computer program products described herein employ computer hardware and/or software to solve problems that are highly technical in nature (e.g., utilizing cloud storage protocols to store potentially high-velocity unbounded data streams), that are not abstract and cannot be performed as a set of mental acts by a human. For example, a human, or even a plurality of humans, cannot efficiently handle the complex, rapid storage of streaming data according to cloud storage provider requirements.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations, receive an application data request that identifies application data to be retrieved from a sequence of stored data chunks that correspond to a stored stream of data. For example, one or more embodiments can receive an application data request that identifies application data to be retrieved from a sequence of stored data chunks that correspond to a stored stream of data.

In another example, memory 165 can store executable instructions that can facilitate generation of location component 124, which can in some implementations, based on the application data request, estimate a first estimated location of the application data, with the first estimated location including an identified chunk of a sequence of chunks. For example, one or more embodiments, location component 124 can, based on the application data request, estimate a first estimated location of the application data, with the first estimated location including an identified chunk of a sequence of chunks.

In another example, memory 165 can store executable instructions that can facilitate generation of data retrieving component 126, which in some implementations can, based on the application data request and a characteristic of the identified chunk, retrieve a first data block that is estimated to include the application data, resulting in a first retrieved data block. For example, one or more embodiments can, based on the application data request and a characteristic of the identified chunk, retrieve a first data block that is estimated to include the application data, resulting in a first retrieved data block.

It is appreciated that the embodiments of the subject disclosure depicted in various figures disclosed herein are for illustration only, and as such, the architecture of such embodiments are not limited to the systems, devices, and/or components depicted therein. For example, in some embodiments, stream storage equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that stream storage equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as stream storage equipment 150. For example, one or more of stream storage equipment 150, and other equipment discussed herein can all be separate subsystems running in the kernel of a computing device as well as operating on separate network equipment, e.g., as depicted in FIG. 1.

As described in some examples below, an example system that can benefit in some circumstances from the use of one or more embodiments, is a system that can facilitate storing and retrieving streaming data among networked computing devices, e.g., file storage systems and databases. In some implementations, system 100 can be a file storage system that implements storage of unbounded data streams. In different implementations, stream storage systems can benefit from increased flexibility, redundancy, security, and decreased latency, which can be provided by one or more embodiments.

Example data storage systems which can employ one or more of the approaches described with embodiments herein include, but are not limited to EMC ISILON®, an example network attached storage (NAS) platform provided by DELL EMC, Inc. Example storage array devices which can employ one or more of the approaches described with embodiments herein include, but are not limited to, POWERMAX® enterprise data storage array system provided by DELL EMC, Inc.

Figure 2:
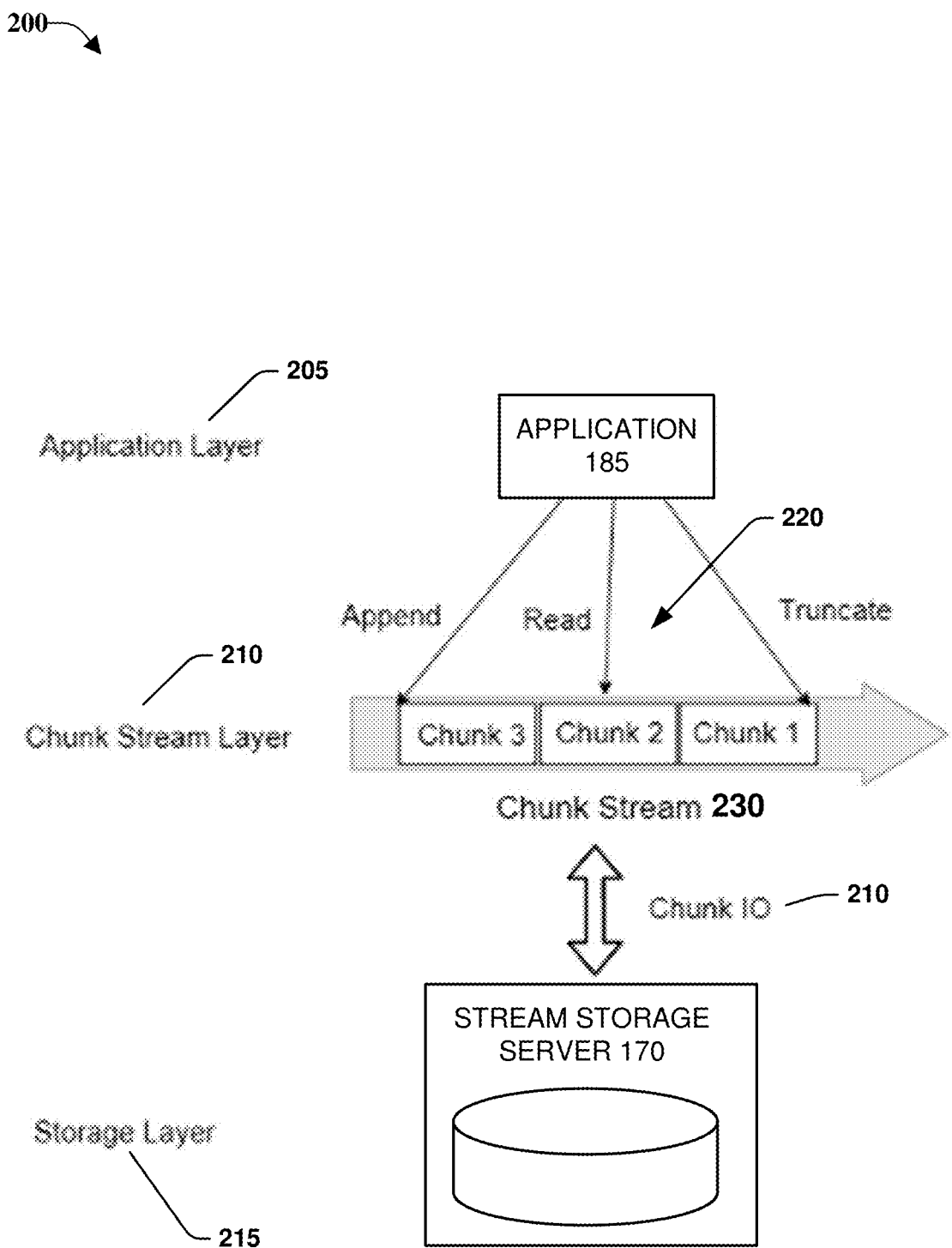
FIG. 2 is an architecture diagram of a non-limiting example system that can facilitate retrieving data from streaming storage, in accordance with one or more embodiments.

FIG. 2 is an architecture diagram of an example system 200 that can facilitate retrieving data from streaming storage, in accordance with one or more embodiments. For purposes of brevity, description of like elements and/or processes employed in other embodiments is omitted. As depicted, application layer 205 includes application 185, chunk stream layer 210 includes chunks 220 of chunk stream 230, and storage layer 215 includes stream storage server 170.

As implemented, stream application layer 205 can support different general stream operations, e.g., append, read, and truncate as shown. For example, in one or more embodiments, application 185 can submit data to be appended to data at chunk stream layer 210, and can also submit requests to read from the data at chunk stream layer 210. In one or more embodiments, chunk stream layer 210 can provide clean abstractions of stream semantics to stream application layer 205. It also connects to underlying object storage to persist data.

As discussed further below, chunk stream layer 210 can organize chunk stream 230 data into chunks grouped sequentially within chunk sequences. In one or more embodiments, ones of data chunks 220 can cover a logical range in the chunk stream 230 to which the data chunk belongs.

Figure 3:
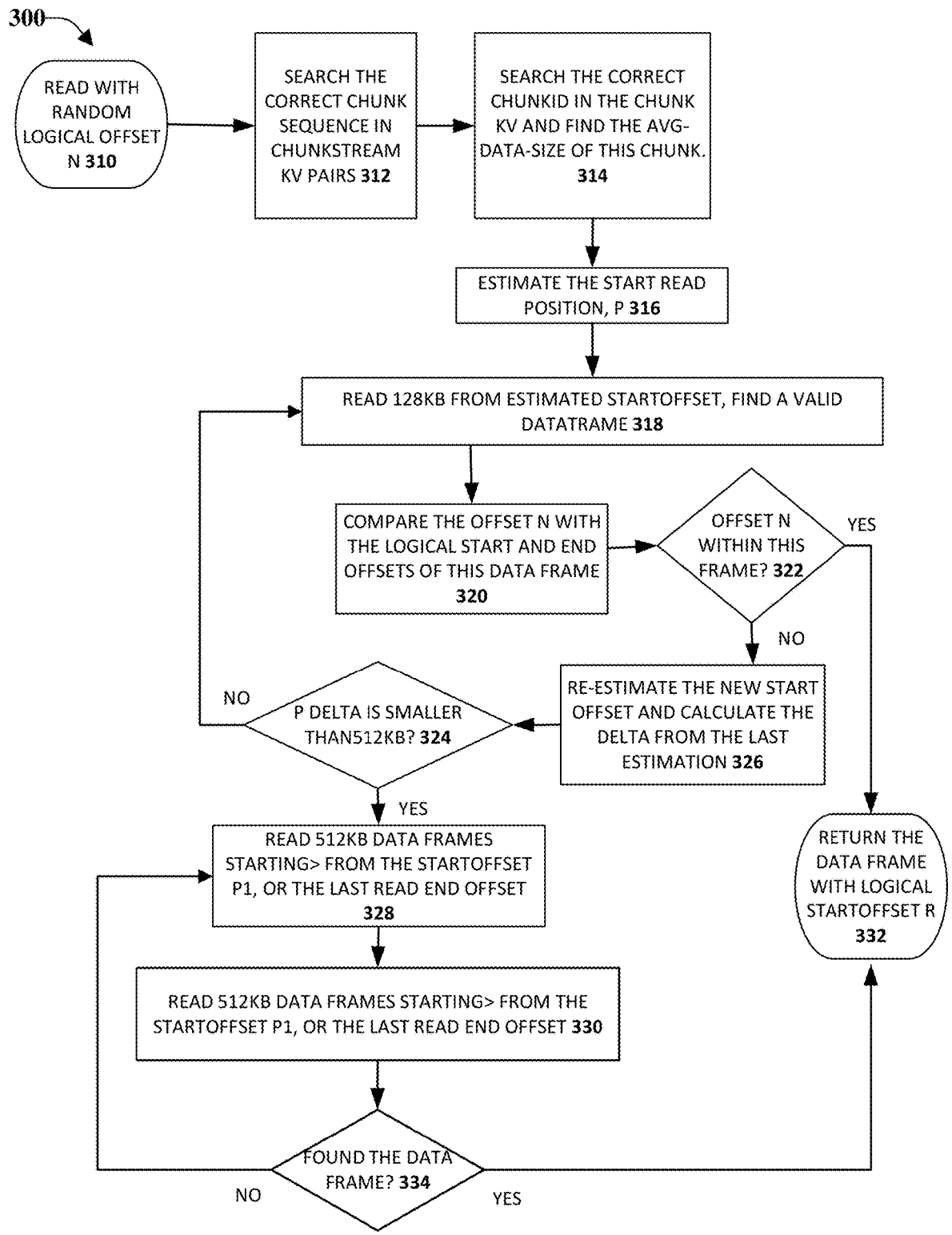
FIG. 3 is a non-limiting example of a data stream broken into separate data chunks for storage at a cloud storage server, in accordance with one or more embodiments.

FIG. 3 is a non-limiting example flow diagram 300 that depicts a random reads process that can be performed by one or more embodiments to facilitate retrieving data from streaming storage, in accordance with one or more embodiments described herein. For purposes of brevity, description of like elements and/or processes employed in other embodiments is omitted.

During a random read process performed by one or more embodiments. described herein, at 310 an arbitrary logical offset n is given by the application, the read process first lists all stream metadata key-value pairs to, at 312, quickly find the correct sequence and correct chunk the offset resides in by comparing the logical start/end offsets of each sequence and each chunk and the offset n from the read request.

And then an estimation of the in-chunk offset is done by calculating the number of frames that might be prior to this given offset n.

The assumption is that the payload size of each data frame in one chunk will be close to each other. That is probably true because the same chunk only belongs to one stream, and applications that write the same stream in a short period of time (e.g., an interval between chunk rotations) would probably have a similar content length of each append. Under this assumption, we can first calculate the number of data frames in this chunk (num-data-frames) by using the gap between physical offsets and logical offsets.

At 314, the average data frame size (avg-data-size) from the num-data-frames. The average data size determination process is described by the following formula:

num-data-frames=(physical endoffset−physical start offset)−(logical endoffset−logical start offset)/36 avg-data-size=(logical end offset−logical start offset)/ num-data-frames

At 316, the avg-data-size of this chunk is used to estimate how many data frames are prior to offset n in this chunk. For example, when the start logical offset of this chunk is m (m<n), then the number N of data frames prior to the offset may be estimated to be N=(n−m)/avg-data-size. In one or more embodiments, with this estimation, the estimated in-chunk physical offset p can be determined, for example, with the formula:

p=N*(36 bytes+avg-data-size)

Based on the estimated start offset, at 318, a first read attempt can read 128 KB at once to read at least one valid data frame (e.g., 64 KB max size). In an implementation, the position of the valid data frame can be estimated by searching the magic number. For example, when the magic number sequence is located in the data, the checksum and epoch can be checked to double confirm the validity of the data frame. Based on this confirmed valid frame, the actual physical offset of the data frame can be stored as p0, and this value can be used to fetch the in-chunk logical offset 1 of the data frame, e.g., to check and adjust our estimated location. If the actual in-chunk logical offset 1 is larger than n, the correct data frame is prior to this data frame, otherwise after this data frame or within this frame. If within this frame, the data frame content is returned to the application. Otherwise, we further estimate our new physical offset p' by calculating the delta between offset n and (m+1) and issue read again with new p' equals:

p'=p0+[n−(m+1)]/avg-data-size*(36 bytes+avg-data-size)

At 324, when the delta of p'−p0 is relatively small (e.g., less than 512 KB), at 328, a data frame can be read can directly read starting from the position p0, forward or backward, depending on whether the p'−p0 is positive or negative. One or more embodiments can read (p'−p0)+128 KB at once and when it is determined that the data frame encompasses the offset n, the data frame content can be returned to application. Alternatively, when it is determined that the data frame does not encompass the offset n, one or more embodiments can read 512 KB until, at 334 target data frame is found.

In an example implementation, when the delta is relatively big (e.g., greater than 512 KB), this can indicate that the first estimate was comparatively less accurate, and thus, at 318, 128 KB can be read starting from the new estimated position p' and the process above can be repeated until, at 332, the target data frame is located.

Figure 4:
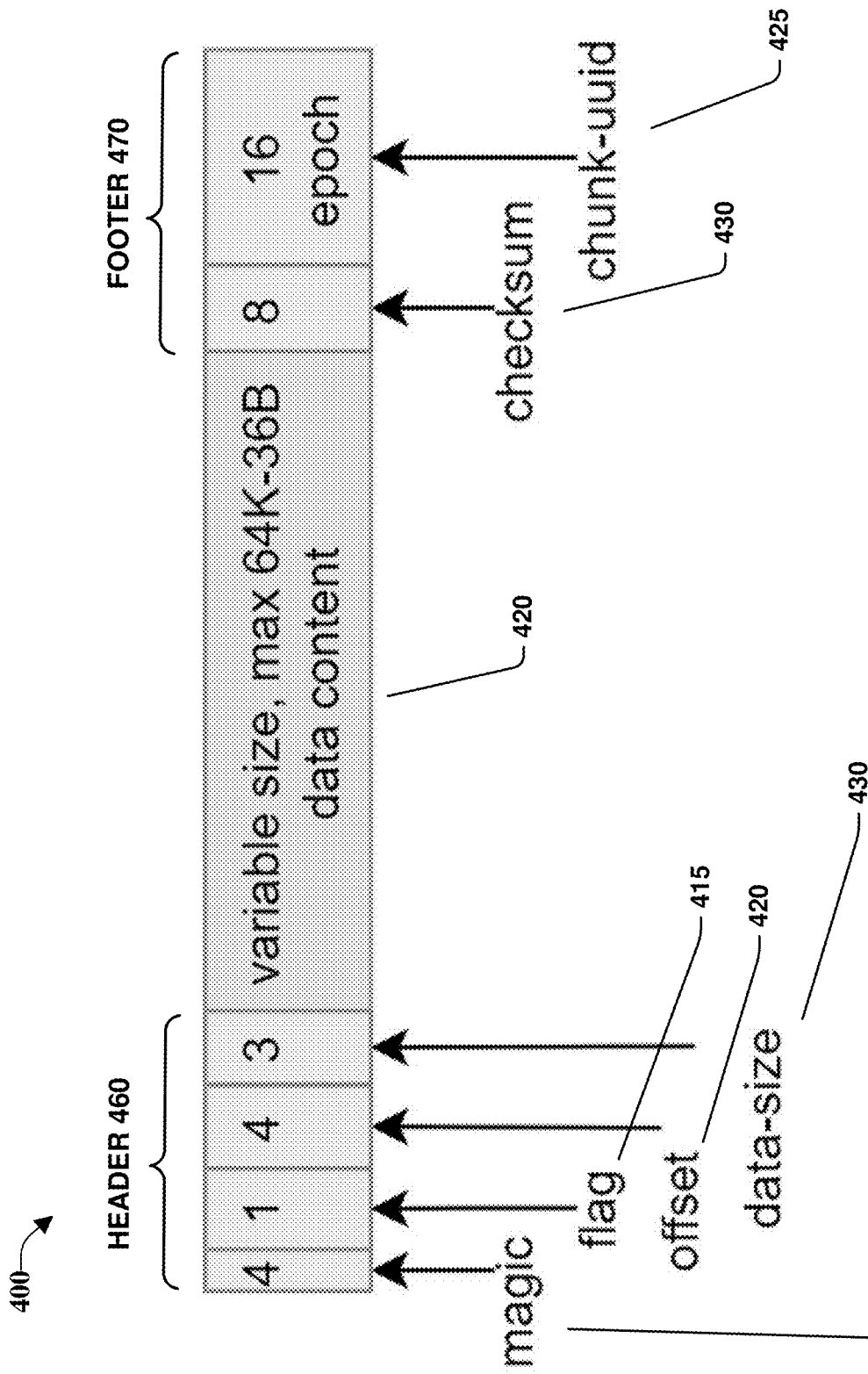
FIG. 4 is an architecture diagram of an example system that can facilitate retrieving data from streaming storage, in accordance with one or more embodiments.

FIG. 4 depicts an example frame 400 that can facilitate retrieving data from streaming storage, in accordance with one or more embodiments. For purposes of brevity, description of like elements and/or processes employed in other embodiments is omitted.

In example frame 400, a 12-bit header 460 can include a 4-byte magic number 410, a 1-byte flag 415, 4-byte in-chunk logical offset 420, and 3-byte data-size 430 length of the payload (e.g., max 64 KB-36 bytes). Continuing this example, footer 470 can include 24 bytes, with an 8-byte CRC of the payload, and 16-byte chunk-uuid of the frame. In this example, because the frame size is 64 KBm, the max payload size can be set to 64 KB-36 bytes. In some implementations, the 64 KB limit can be determined based two contradicting factors: e.g., if the limit is too small, big events (e.g., a 1 GB event) may cost too many data frames based on the required overhead. Alternatively, if the limit is set too big, the random event retrieval process may have read amplification from perspective of the disk input/output.

In one or more embodiments, each chunk can have a pair of logical start/end offsets that indicate which logical range its content covers in the whole stream, e.g., the logical range can be the data content range from the perspective of an application.

In addition, in one or more embodiments, each chunk also has a pair of physical start/end offsets. In some implementations, physical offsets can include data that have headers and footers, and thus are generally larger than logical offsets. As implemented, physical offset ranges can provide information about how much data framing overhead has been introduced in each chunk, e.g., because the overhead of one data frame is constant, the number of data frames in one chunk can be determined from the difference between logical start/end offsets and physical offset/end offsets. By using this structure, each sequence can have a global physical and logical start/end offset that can indicate the sequence level offsets in the stream, e.g., to make positioning a reading cursor to a corresponding sequence more efficient in a random stream read process.

Figure 5:
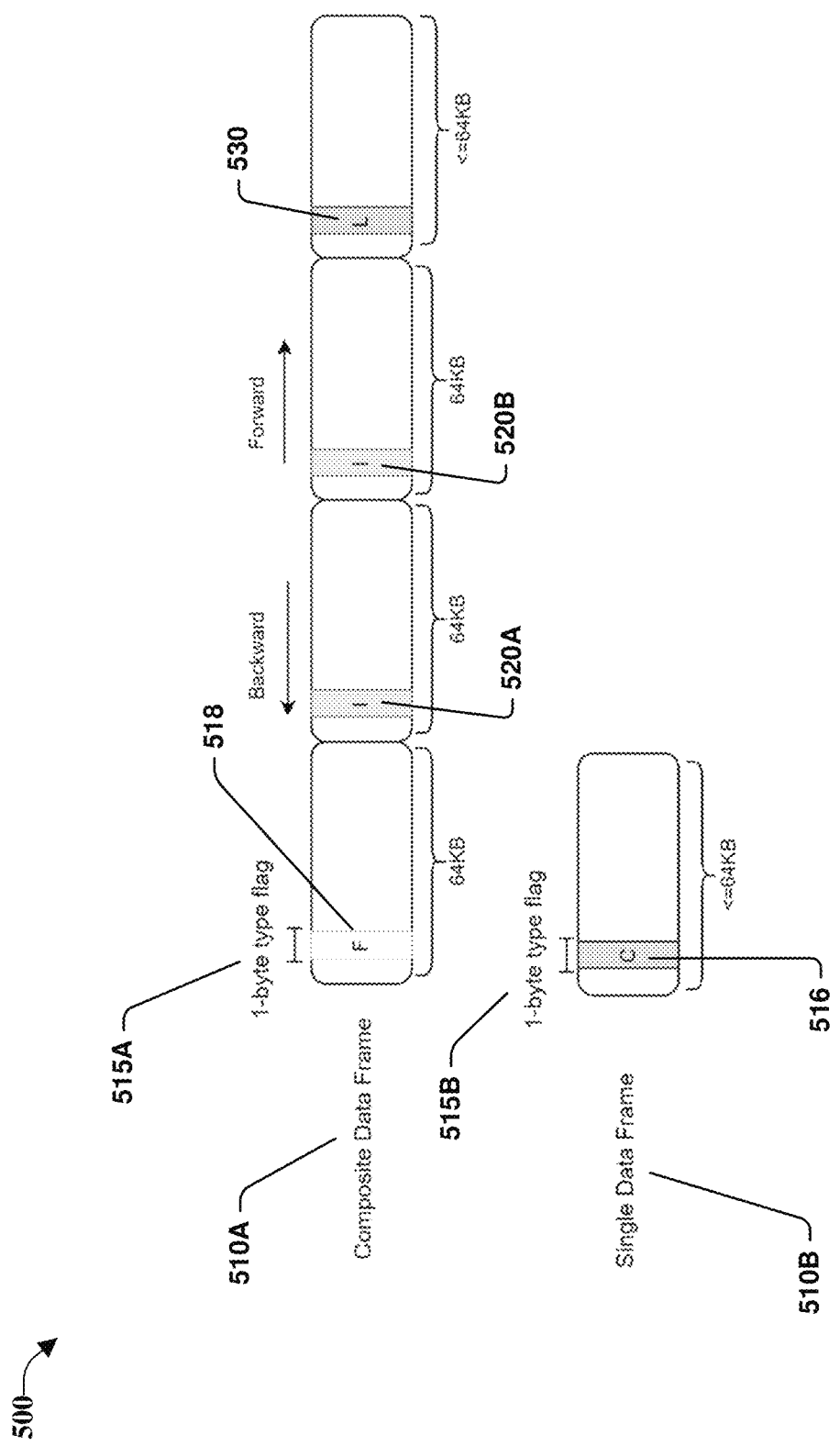
FIG. 5 illustrates non-limiting examples of different data frame layouts that can facilitate retrieving data from streaming storage, in accordance with one or more embodiments.

FIG. 5 illustrates non-limiting examples 500 of different data frame layouts that can facilitate retrieving data from streaming storage, in accordance with one or more embodiments. For purposes of brevity, description of like elements and/or processes employed in other embodiments is omitted.

Examples 500 include composite data frame 510A and single data frame 510B, in accordance with one or more embodiments described herein. In one or more embodiments, with this layout, data to be appended can be arbitrarily long, even longer than a chunk size (e.g., 128 MB). As depicted, composite data frame 410. With this layout, the data to append can be arbitrarily long, even longer than a chunk size (e.g., 128 MB).

In an example implementation, in composite data frame 510A the 1-byte flag 515A in the footer can be used to indicate whether this data frame is a: 1) a completed data frame 516 (denoted as type C) that can encompass data in one append operation, 2) a first data frame 518 (denoted as type F) in a larger composite data frame, 3) an intermediate data frame 520A-B (denoted as type I) in a larger composite data frame can comes after the first one, or 4) a last data frame 530 (denoted as type L) in a composite data frame. With these 4 types of data frame, the random read process can successfully position the start offset of a large data frame.

In an example implementation, when a read process finds the type C 516 data frame, the frame is considered a whole frame with no tailing frames. When a type F 518 data frame is located, one or more embodiments can continue parsing tailing frames until a type L 530 data frame is identified, e.g., resulting in a composite data frame. Alternately, when the process encounters type I 520A-B or type L 530 data frame, parsing can continue in reverse until a type F 518 data frame is located. In case of a type I 520A-B data frame, data frames can be parsed forward until a type L 530 data frame is identified. Using the above example approaches, one or more embodiments can identify all the data frames that are included within a large data append.

Figure 6:
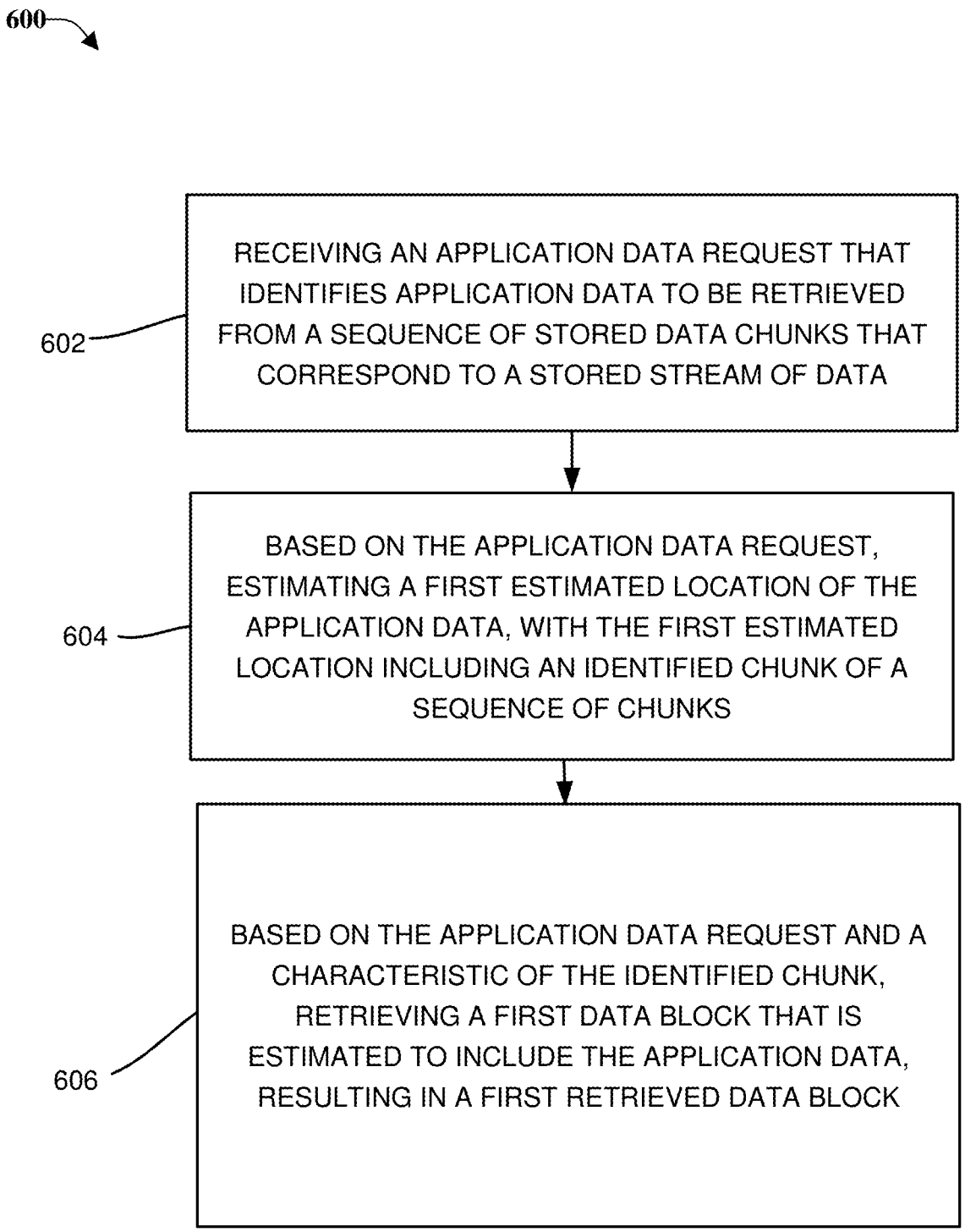
FIG. 6 depicts a flow diagram representing example operations of an example method that can facilitate retrieving data from streaming storage, in accordance with one or more embodiments.

FIG. 6 depicts a flow diagram representing example operations of an example method 600 that can facilitate retrieving data from streaming storage, in accordance with one or more embodiments. For purposes of brevity, description of like elements and/or processes employed in other embodiments is omitted.

In some examples, one or more embodiments of method 600 can be implemented by receiving component 122, location component 124, data retrieving component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can, in one or more embodiments, receive an application data request that identifies application data to be retrieved from a sequence of stored data chunks that correspond to a stored stream of data, in accordance with one or more embodiments. At 604 of method 600, location component 124 can, in one or more embodiments, based on the application data request, estimate a first estimated location of the application data, with the first estimated location including an identified chunk of a sequence of chunks. At 606 of method 600, data retrieving component 126 can, in one or more embodiments, based on the application data request and a characteristic of the identified chunk, retrieve a first data block that is estimated to include the application data, resulting in a first retrieved data block, in accordance with one or more embodiments.

Figure 7:
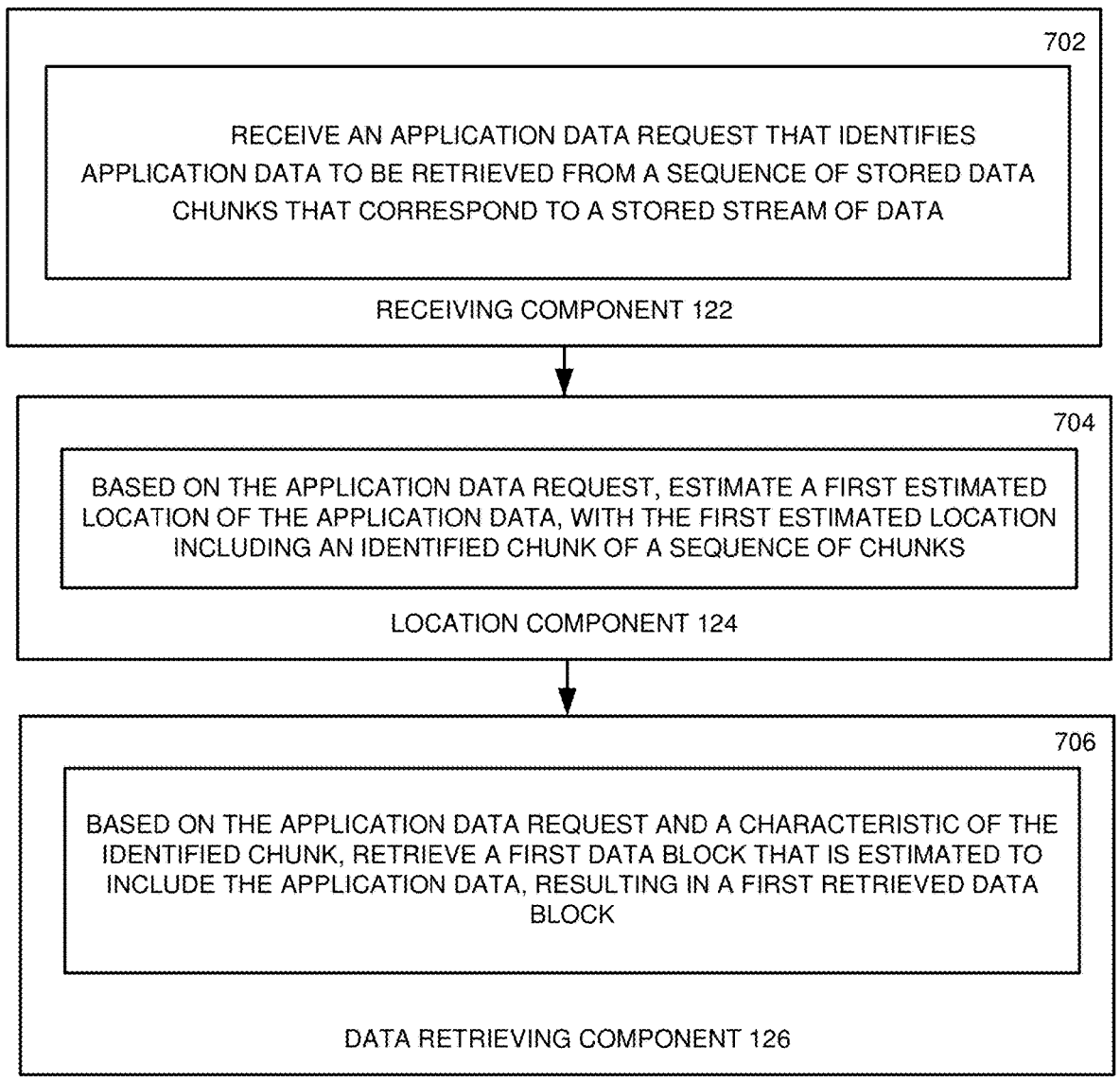
FIG. 7 depicts an example system that can facilitate retrieving data from streaming storage, in accordance with one or more embodiments.

FIG. 7 depicts an example system 700 that can facilitate retrieving data from streaming storage, in accordance with one or more embodiments. For purposes of brevity, description of like elements and/or processes employed in other embodiments is omitted. Example system 700 can include receiving component 122, location component 124, data retrieving component 126, and other components that can be used to implement aspects of system 800, as described herein, in accordance with one or more embodiments.

At 702 of FIG. 7, receiving component 122 can, receive an application data request that identifies application data to be retrieved from a sequence of stored data chunks that correspond to a stored stream of data, in accordance with one or more embodiments. At 704 of FIG. 7, location component 124 can, based on the application data request, estimate a first estimated location of the application data, with the first estimated location including an identified chunk of a sequence of chunks, in accordance with one or more embodiments. At 706 of FIG. 7, data retrieving component 126 can, based on the application data request and a characteristic of the identified chunk, retrieve a first data block that is estimated to include the application data, resulting in a first retrieved data block, in accordance with one or more embodiments.

Figure 8:
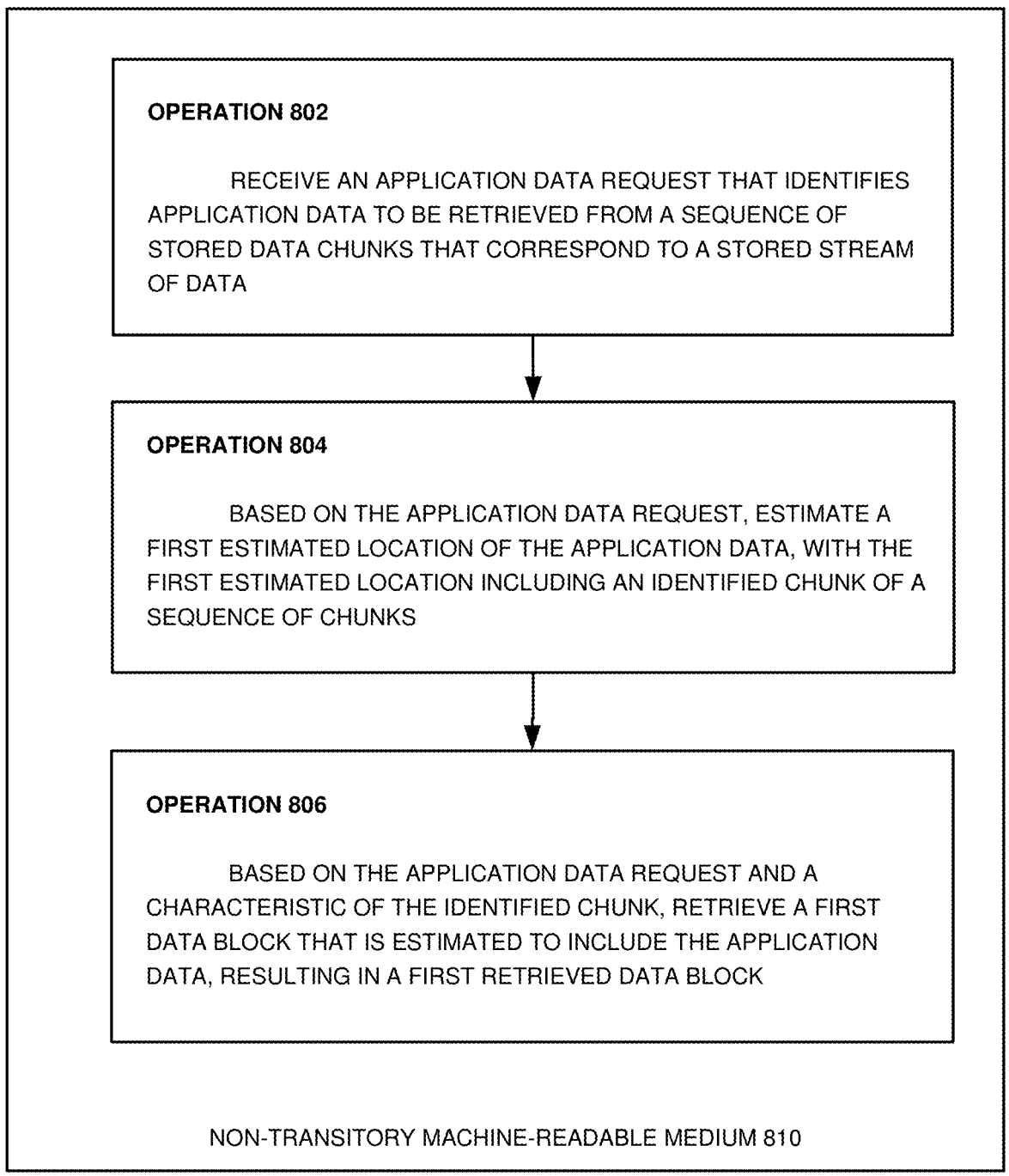
FIG. 8 depicts an example non-transitory machine-readable medium that can include executable instructions that, when executed by a processor of a system, can facilitate retrieving data from streaming storage, in accordance with one or more embodiments.

FIG. 8 depicts an example 800 non-transitory machine-readable medium 810 that can include executable instructions that, when executed by a processor of a system, can facilitate retrieving data from streaming storage, in accordance with one or more embodiments. For purposes of brevity, description of like elements and/or processes employed in other embodiments is omitted.

Operation 802 of FIG. 8 can facilitate generation of receiving component 122 which, in one or more embodiments, can, receive an application data request that identifies application data to be retrieved from a sequence of stored data chunks that correspond to a stored stream of data. Operation 804 of FIG. 8 can facilitate generation of location component 124, which, in one or more embodiments, can, based on the application data request, estimate a first estimated location of the application data, with the first estimated location including an identified chunk of a sequence of chunks. Operation 806 of FIG. 8 can facilitate generation of data retrieving component 126 which, in one or more embodiments can, based on the application data request and a characteristic of the identified chunk, retrieve a first data block that is estimated to include the application data, resulting in a first retrieved data block.

Figure 9:
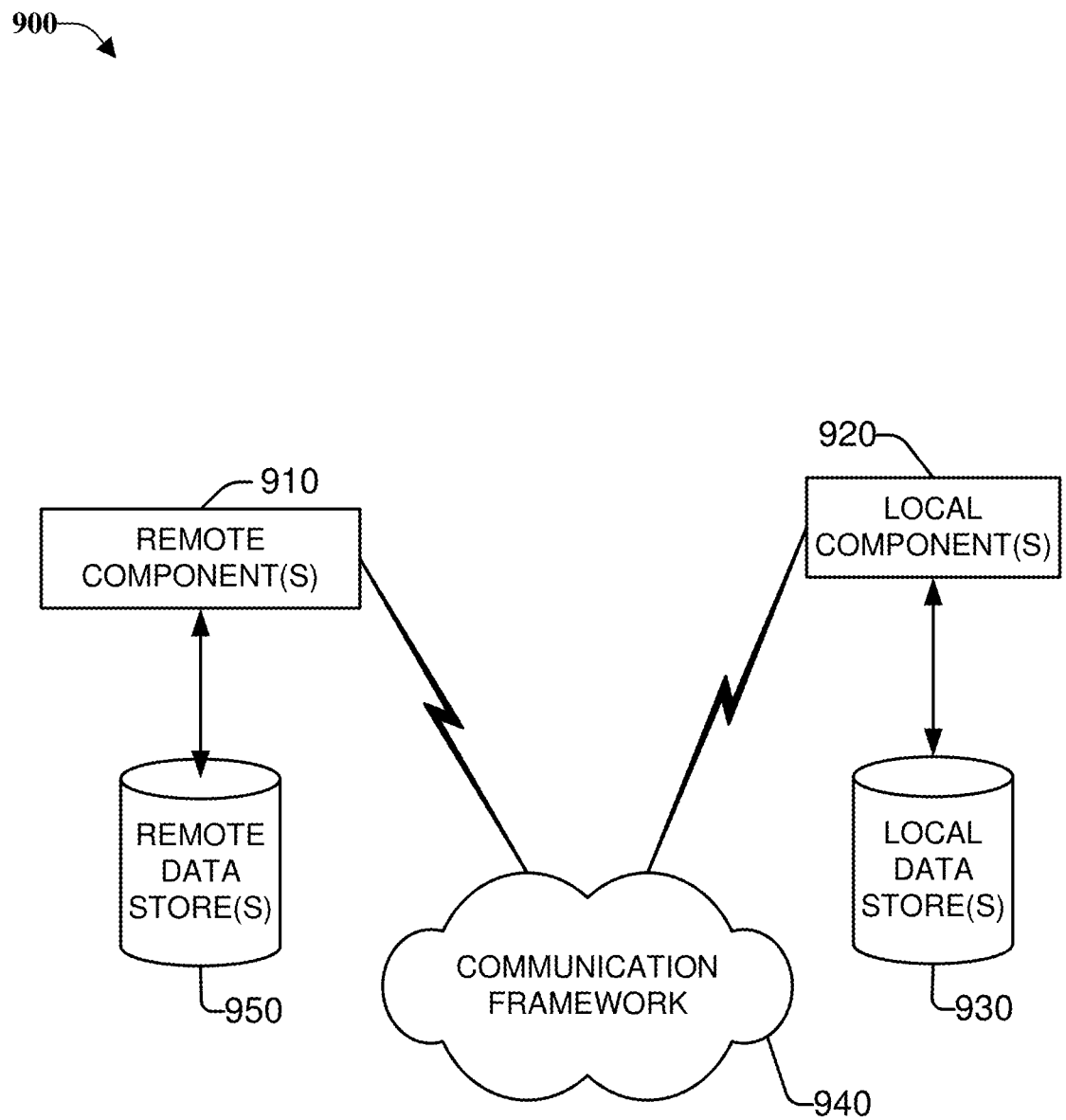
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact, in accordance with one or more embodiments. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database." and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 920 (see below), non-volatile memory 922 (see below), disk storage 924 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
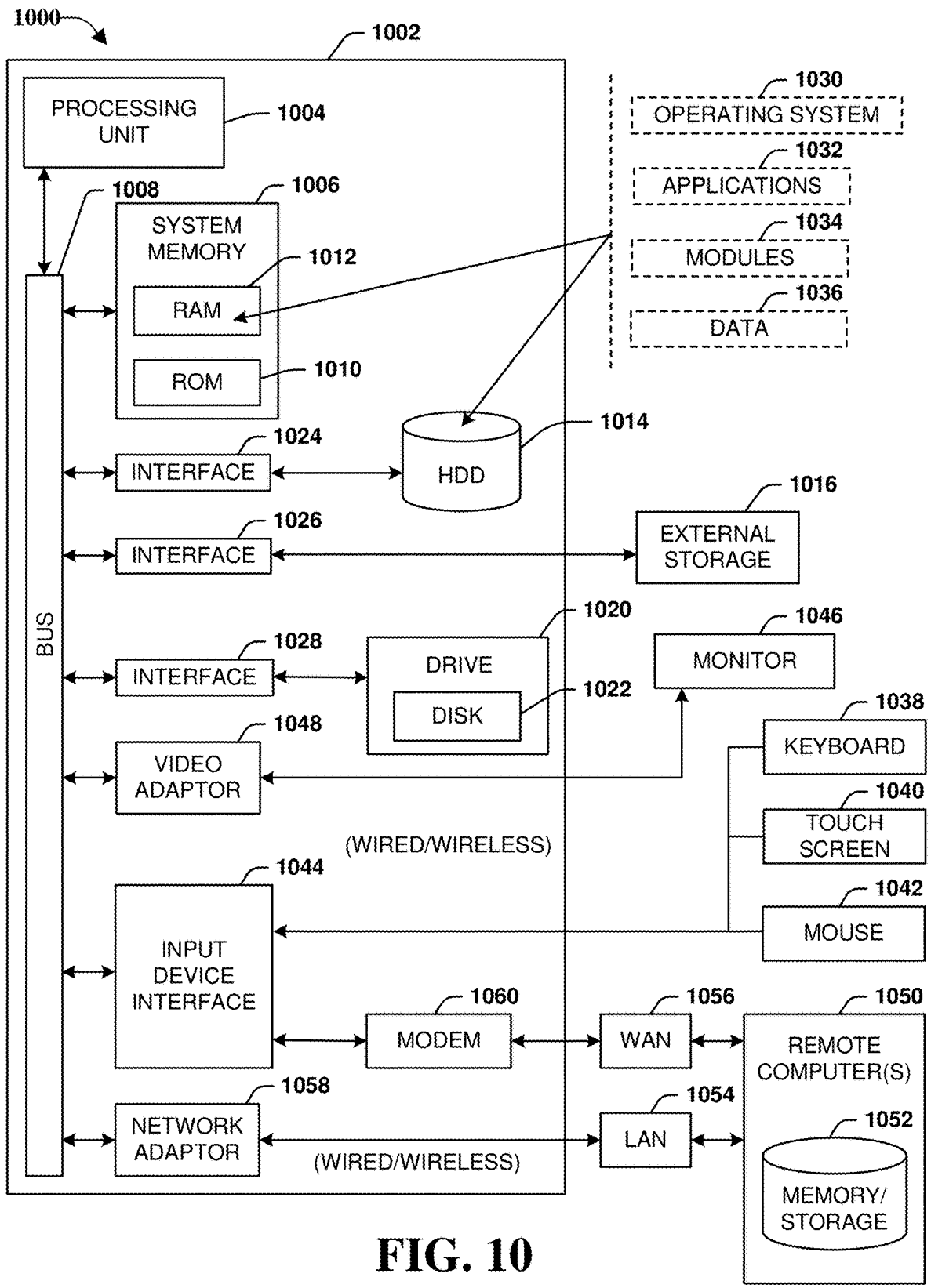
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF. VHF, UHF. SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a system comprising at least one processor, an application data request that identifies application data to be retrieved from a stored stream of data, wherein the stored stream of data comprises a sequence of chunks, and wherein the chunks respectively comprise at least one data frame; and based on the application data request, performing, by the system, a read process to retrieve a data frame comprising the application data, where the read process comprises:
determining, based on a target logical stream offset for the stored stream of data specified in the application data request, an identified chunk of the sequence of chunks that comprises the application data;
determining an estimated in-chunk physical offset within the identified chunk for the application data, wherein the estimated in-chunk physical offset is determined based on an estimated quantity of data frames within the identified chunk prior to the target logical stream offset, an average data frame size of the data frames in the identified chunk, and a combined size of a header and a footer of the data frames;
retrieving, based on the estimated in-chunk physical offset, a first data frame within the identified chunk that is estimated to comprise the application data; and
in response to determining that the first data frame comprises the application data:
setting the first data frame as the data frame comprising the application data, and
returning a response to the application data request comprising content from the data frame.

2. The method of claim 1, wherein the target logical offset identifies a position relative to a different position specified in the stored stream of data.

3. The method of claim 1, wherein the read process further comprises:
determining an in-chunk logical offset based on the estimated in-chunk physical offset within the identified chunk; and
determining whether the first data frame comprises the application data based on a comparison of the in-chunk logical offset and the target logical stream offset.

4. The method of claim 1, wherein the identified chunk is identified based on the target logical offset being determined to be within a starting logical stream offset for the identified chunk and an ending logical stream offset for the identified chunk.

5. The method of claim 1, wherein the read process further comprises:
determining a quantity of data frames in the identified chunk based on a physical start stream offset of the identified chunk, a physical end stream offset of the identified chunk, a logical start stream offset of the identified chunk, and a logical end stream offset of the identified chunk.

6. The method of claim 5, wherein the read process further comprises:
determining the average data frame size for the identified chunk based on the quantity of data frames within the identified chunk and a logical chunk size of the identified chunk; and
determining the estimated quantity of data frames within the identified chunk prior to the target logical stream offset based on the target logical stream offset, the logical start stream offset of the identified chunk, and the average data frame size.

7. The method of claim 6, wherein the logical chunk size of the identified chunk corresponds to a difference between the logical start stream offset and the logical end stream offset.

8. The method of claim 3, wherein the read process further comprises:
in response to determining that the first data frame does not comprise the application data, iteratively performing until the data frame comprising the application data is located:
determining a revised estimated in-chunk physical offset within the identified chunk for the application data based on the previous estimated in-chunk physical offset, the target logical stream offset, a logical start stream offset of the identified chunk, the average data frame size, and the combined size of the header and the footer of the data frames;
retrieving, based on the revised estimated in-chunk physical offset, a second data frame within the identified chunk that is estimated to comprise the application data; and
in response to determining that the first data frame comprises the application data:
setting the second data frame as the data frame comprising the application data, and
returning the response to the application data request comprising content from the second data frame.

9. Storage equipment, comprising:
at least one processor; and
at least one memory that stores executable instructions that, when executed by the at least one processor, facilitate performance of operations, comprising:
receiving a data request that identifies requested data to be retrieved from a stored stream of data, wherein the stored stream of data comprises a sequence of data chunks, wherein the chunks respectively comprise at least one data frame;
based on the data request, performing a read process to retrieve a data frame comprising the requested data, where the read process comprises:
determining, based on a target logical stream offset for the stored stream of data specified in the data request, an identified chunk of the sequence of chunks that comprises the requested data;
determining an estimated in-chunk physical offset within the identified chunk for the requested data, wherein the estimated in-chunk physical offset is determined based on an estimated quantity of data frames within the identified chunk prior to the target logical stream offset, an average data frame size of the data frames in the identified chunk, and a combined size of a header and a footer of the data frames;
retrieving, based on the estimated in-chunk physical offset, a first data frame within the identified chunk that is estimated to comprise the requested data; and
in response to determining that the first data frame comprises the requested data:
setting the first data frame as the data frame comprising the requested data, and
returning a response to the data request comprising content from the data frame.

10. The storage equipment of claim 9, wherein the target logical stream offset identifies a position defined relative to a reference position in the stored stream of data.

11. The storage equipment of claim 2, wherein the read process further comprises:
determining an in-chunk logical offset based on the estimated in-chunk physical offset within the identified chunk; and
determining whether the first data frame comprises the requested data based on a comparison of the in-chunk logical offset and the target logical stream offset.

12. The storage equipment of claim 11, wherein the read process further comprises:
in response to determining that the first data frame does not comprise the requested data:
determining a revised estimated in-chunk physical offset within the identified chunk for the requested data based on the estimated in-chunk physical offset, the target logical stream offset, a logical start stream offset of the identified chunk, the average data frame size, and the combined size of the header and the footer of the data frames;
retrieving, based on the revised estimated in-chunk physical offset, a second data frame within the identified chunk that is estimated to comprise the requested data; and
in response to determining that the first data frame comprises the requested data:
setting the second data frame as the data frame comprising the requested data, and
returning the response to the data request comprising content from the second data frame.

13. The storage equipment of claim 9, wherein the read process further comprises:
determining a quantity of data frames in the identified chunk based on a physical start stream offset of the identified chunk, a physical end stream offset of the identified chunk, a logical start stream offset of the identified chunk, and a logical end stream offset of the identified chunk.

14. The storage equipment of claim 13, wherein the read process further comprises:
determining the average data frame size for the identified chunk based on the quantity of data frames within the identified chunk and a logical chunk size of the identified chunk; and
determining the estimated quantity of data frames within the identified chunk prior to the target logical stream offset based on the target logical stream offset, the logical start stream offset of the identified chunk, and the average data frame size.

15. A non-transitory machine-readable medium, comprising executable instructions that, when executed by at least one processor of a user equipment, facilitate performance of operations, comprising:
receiving a request that indicates particular data to be retrieved from a stored stream of data, wherein the stored stream of data comprises a sequence of chunks, wherein the chunks respectively comprise at least one data frame; and
based on the request, performing a read process to retrieve a data frame comprising the particular data, where the read process comprises:
determining, based on a target logical stream offset for the stored stream of data specified in the request, an identified chunk of the sequence of chunks that comprises the specified data;

determining an estimated in-chunk physical offset within the identified chunk for the particular data, wherein the estimated in-chunk physical offset is determined based on an estimated quantity of data frames within the identified chunk prior to the target logical stream offset, an average data frame size of the data frames in the identified chunk, and a combined size of a header and a footer of the data frames; and retrieving, based on the estimated in-chunk physical offset, a first data frame within the identified chunk that is estimated to comprise the particular data; and in response to determining that the first data frame comprises the particular data:
setting the first data frame as the data frame comprising the particular data, and
returning a response to the request comprising content from the data frame.

16. The non-transitory machine-readable medium of claim 15, wherein the target logical stream offset identifies a position relative to a different point in the stored stream of data.

17. The non-transitory machine-readable medium of claim 15, wherein the read process further comprises:
determining an in-chunk logical offset based on the estimated in-chunk physical offset within the identified chunk; and
determining whether the first data frame comprises the particular data based on a comparison of the in-chunk logical offset and the target logical stream offset.

18. The non-transitory machine-readable medium of claim 17, wherein the read process further comprises:
in response to determining that the first data frame does not comprise the particular data:
determining a revised estimated in-chunk physical offset within the identified chunk for the particular data based on the estimated in-chunk physical offset, the target logical stream offset, a logical start stream offset of the identified chunk, the average data frame size, and the combined size of the header and the footer of the data frames;
retrieving, based on the revised estimated in-chunk physical offset, a second data frame within the identified chunk that is estimated to comprise the particular data; and
in response to determining that the first data frame comprises the particular data:
setting the second data frame as the data frame comprising the particular data, and
returning the response to the request comprising content from the second data frame.

19. The non-transitory machine-readable medium of claim 15, wherein the read process further comprises:
determining a quantity of data frames in the identified chunk based on a physical start stream offset of the identified chunk, a physical end stream offset of the identified chunk, a logical start stream offset of the identified chunk, and a logical end stream offset of the identified chunk.

20. The non-transitory machine-readable medium of claim 19, wherein the read process further comprises:
determining the average data frame size for the identified chunk based on the quantity of data frames within the identified chunk and a logical chunk size of the identified chunk; and
determining the estimated quantity of data frames within the identified chunk prior to the target logical stream offset based on the target logical stream offset, the logical start stream offset of the identified chunk, and the average data frame size.

* * * * *